United States Patent Office
3,092,618
Patented June 4, 1963

3,092,618
WATER-SOLUBLE NON-IONIC SURFACE-ACTIVE AGENTS OF MONO AND POLYSACCHARIDES
Milton J. Rosen, 131—29 231st, Jamaica, N.Y., and Irving Allan Kaye, 1417 E. 34th St., Brooklyn, N.Y.
No Drawing. Filed July 7, 1960, Ser. No. 41,266
14 Claims. (Cl. 260—209)

This invention relates to non-ionic surface-active agents consisting of carbohydrate molecules having oxygen-bound side groups. Known carbohydrate-base surface active agents are of the ester type. They are liable to be saponified in an alkaline medium and have, therefore, a limited use.

The invention has the object to provide alkali-resistant carbohydrate-base non-ionic surface active agents.

The invention consists in carbohydrate-based non-ionic surface agents being hexose monosaccharides or polysaccharides etherified with a radical (herein referred to as hemiacetal radical for short) having the general formula

wherein $R^1$ stands for an aliphatic or cycloaliphatic hydrocarbon radical and $R^2$ for a hydrocarbon radical or hydrogen; the number of hemiacetal radicals is at least 1 in the whole molecule, and at most 2 for each hexose unit of the molecule; the aggregate number of carbon atoms of the $R^1$ and $R^2$ radicals, calculated per hexose unit, is from 4 to 19, in the case of a polysaccharide, or from 10 to 19 per hexose unit in the case of a monosaccharide; and the carbohydrate used is soluble or colloidally soluble in water.

For the purpose of calculating the number of carbon atoms in $R^1$ and/or $R^2$, a hydrocarbon radical containing one or more cyclic structures is considered to contain 2 carbon atoms less for each cyclic structure in the radical. Thus, a cyclohexyl or phenyl radical is considered to contain 4 carbon atoms, and a cholesteryl radical is considered to contain 19 carbon atoms.

The indication of proportions of hemiacetal radicals per hexose unit, as well as of carbon atoms of the $R^1$ and $R^2$ radicals per hexose unit, is arithmetical and does not necessarily correspond to the true structural configuration of the molecule, as the latter may contain some hexose units having more than 2 etherifying radicals, and others that are not etherified at all.

For the sake of simplicity the term polysaccharide is used in this specification for the designation of molecules containing more than 1 hexose unit and, therefore, includes disachharides and trisaccharides. Suitable carbohydrates are, for example, glucose, galactose, lactose, maltose, sucrose, dextrine, and the like.

The invention also provides for the preparation of the above surface active agents.

According to one method an α-haloether of the formula

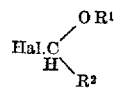

wherein $R^1$ and $R^2$ have the same meaning as in Formula I above, and Hal stands for chlorine or bromine, is reacted with the carbohydrate chosen.

According to another method the carbohydrate is reacted with a vinyl ether of the formula

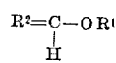

wherein $R^2$ stands for a methylene radical and $R^1$ has the same meaning as in Formula I.

The α-haloether or vinyl ether need not be purified before being reacted with the carbohydrate, but, if it is desired to purify it, this may be done, for example, by distillation.

For the reaction between the α-haloether or vinyl ether and the carbohydrate, a neutral non-hydroxylic organic solvent or solvent mixture in which both reactants are soluble, e.g. N,N-dimethyl formamide, or in which the carbohydrate alone is soluble, e.g. dimethyl sulfoxide (methyl-sulfinyl methane), is preferably added to the reaction mixture. For the reaction of the α-haloether and the carbohydrate, the reaction is preferably carried out in the presence of a base, such as an alkali metal carbonate or bicarbonate, whose presence will not cause dehydration of the carbohydrate under the conditions of reaction, in order to neutralize the hydrogen halide produced in the reaction. The reaction between the vinyl ether and the carbohydrate is carried out in the presence of a small amount of an acidic halide, such as anhydrous hydrogen chloride, which will not polymerize the vinyl ether, or in the presence of a small amount of an α-haloether, as a catalyst.

The α-haloether used may be prepared in a known manner by the reaction of an alcohol, an aldehyde and a hydrogen halide. The vinyl ether used may be prepared in a known manner by the reaction of acetylene and an alcohol. The alcohols may be straight-chain or branched-chain saturated or unsaturated aliphatic or cycloaliphatic alcohols, such as, fore example, 1-hexanol, 2-ethyl-hexanol-(1), lauryl alcohol, oleyl alcohol, stearyl alcohol, cyclohexanol, cholesterol and the like. Mixtures of alcohols such as those of mainly lauryl and myristyl alcohols, commercially known as lauryl alcohols, or of saturated and unsaturated alcohols commercially known as tallow alcohols, or of alcohols from the oxo process are also suitable.

Suitable aldehydes are both aliphatic and aromatic aldehydes such as, for example, formaldehyde, paraformaldehyde, paracetaldehyde, heptaldehyde and benzaldehyde.

The invention is illustrated by the following examples to which it is not limited.

*Example 1*

A mixture of 33 g. of paraformaldehyde, 102 g. of 1-hexanol and 122 g. of anhydrous calcium chloride was placed in a three-necked flask protected from the access of moisture by a drying tube containing calcium chloride and connected to one of the necks, and provided with an efficient stirring device mounted in a second neck. Through the third neck, dry gaseous hydrogen chloride was introduced into the mixture at 26 to 29° C. until the mixture was saturated. The mixture was then filtered in order to remove calcium chloride, and the filtrate was distilled under reduced pressure. A fraction boiling at 71–74° C./17 mm. Hg was collected. This consisted mainly of the α-chloroether $C_6H_{12}.O.CH_2Cl$, i.e. chloromethyl-n-hexyl ether. The chlorine content of this fraction was 99.9% of the theoretically required amount.

18 g. of sucrose and 10.6 g. of anhydrous sodium carbonate were suspended in 50 ml. of N,N-dimethylformamide in a 3-necked flask protected from the access of moisture by a drying tube containing calcium chloride connected to one of the necks, and provided with an efficient stirring device mounted in a second neck. The mixture was heated with stirring to 50±2° C. and admixed in the course of 3 hours with 15 g. of the aforesaid α-chloroether dissolved in 20 ml. of N,N-dimethylformamide. The mixture was then stirred for another hour at 50±2° C., and then filtered. The filtrate was extracted with two successive portions of 40 ml. each of petroleum ether.

From the raffinate the solvent was distilled off under reduced pressure. The residue consisted of 30 g. of a viscous, almost colourless soft resin. This resin was stirred with 150 ml. of warm acetone until it was completely dispersed. The mixture was filtered and the acetone-insoluble filter residue was washed with 50 ml. of acetone. The filtrate and washings were combined and the solvent was distilled off below 85° C. under reduced pressure. The residue was 21.7 g. of an almost colourless soft resin. A 0.01% dispersion thereof in distilled water had a surface tension of 30.9 dynes/cm. at 25° C. and an interfacial tension against mineral oil of 5.5. dynes/cm. at 25° C.

The resin thus obtained was further purified by extracting it three times with boiling petroleum ether, suspending the petroleum-ether-insoluble matter in acetone and removing the acetone-insluble matter by filtration. The acetone was evaporated under reduced pressure and the residue was dried over phosphorus pentoxide in a vacuum desiccator, whereby the product was obtained as a white, crystalline, hygroscopic solid.

*Analysis.*—C=55.5%; H, 9.12%; calculated: C=54.7%; H, 8.83%.

The above theoretical carbon and hydrogen contents were calculated for di-(hexyloxymethyl)-sucrose,

$$C_{12}H_{20}O_{11}(CH_2OC_6H_{13})_2$$

A 0.01% dispersion of the purified substance in distilled water had a surface tension of 29.0 dynes/cm. at 24° C. and an interfacial tension against mineral oil of 3.9 dynes/cm. at 24° C.

*Example 2*

Into a mixture of 33 g. of paraformaldehyde, 122 g. of anhydrous calcium chloride and 258 g. of tallow alcohol heated to 40° C. in an apparatus similar to that of Example 1, dry hydrogen chloride gas was introduced with stirring until the mixture was saturated. The mixture was then filtered. The filtrate was the crude α-chloroether; after bubbling dry air through it for 1 hour under a pressure of 20 mm. Hg it contained 100.5% of the theoretically required amount of chlorine.

15.3 g. of this α-chloroether, dissolved in 25 ml. of N,N-dimethyl-formamide, was added with stirring in the course of 6 hours to a mixture of 18 g. of sucrose, 5.3 g. of anhydrous sodium carbonate and 50 ml. of N,N-dimethylformamide preheated to and maintained at 45 to 55° C. in an apparatus similar to that of Example 1, and the resulting mixture was stirred for another hour at 45 to 55° C. Then the mixture was filtered and the filtrate was extracted with two successive portions of 40 ml. each of petroleum ether. From the raffinate obtained from the petroleum ether extraction the solvent was distilled off below 85° C. under reduced pressure. The residue consisted of 30.5 g. of an almost white, waxy resin. This material showed good emulsifying properties. A 0.01% dispersion thereof in distilled water had a surface tension of 34.2 dynes/cm. at 25° C., and an interfacial tension against mineral oil of 6.3 dynes/cm. at 22° C.

*Example 3*

30.7 g. of the crude α-chloroether prepared in Example 2, dissolved in 25 ml. of N,N-dimethylformamide, was added with stirring in the course of 6 hours to a mixture of 17.1 g. of sucrose, 10.6 g. of anhydrous sodium carbonate, and 50 ml. of N,N-dimethylformamide maintained at 45 to 50° C. in the usual type of apparatus protected from the access of moisture, and the resulting mixture was stirred for another hour at 45 to 50° C. Then the mixture was filtered and the solvent was distilled off from the filtrate below 85° C. under reduced pressure. The residue was a cloudy, almost colorless viscous liquid weighing 48 g. A 0.01% dispersion thereof in distilled water had a surface tension of 35.7 dynes/cm. at 25° C. and an interfacial tension against mineral oil of 11.0 dynes/cm. at 24° C.

*Example 4*

Into a stirred mixture of 130 g. of 2-ethylhexanol, 33 g. of paraformaldehyde, and 167 g. of anhydrous calcium chloride maintained at 25–28° C. in the usual apparatus protected from the access of moisture, dry hydrogen chloride gas was introduced until the mixture was saturated. The reaction mixture was filtered, and the filtrate was distilled under reduced pressure. A fraction boiling at 96 to 100° C. at 21 mm. Hg was collected. This consisted mainly of the α-chloroether, 2-ethylhexyl chloromethyl ether.

8.9 g. of this α-chloroether fraction, dissolved in 25 ml. of N,N-dimethylformamide, was added with stirring in the course of 3 hours to a mixture of 18.9 g. of sucrose, 5.3 g. of anhydrous sodium carbonate, and 50 ml. of N,N-dimethylformamide maintained at 48 to 52° C. in the usual type of apparatus protected from the access of moisture, and the resulting mixture was stirred for another hour at 48 to 52° C. Then the mixture was filtered and the filtrate was extracted with two successive portions of 40 ml. each of petroleum ether. From the raffinate obtained by the petroleum ether extraction, the solvent was distilled off below 85° C. under reduced pressure. The residue, which was an almost colorless, soft resin, weighed 27 g. A 0.1% dispersion thereof in distilled water had a surface tension of 30.4 dynes/cm. at 25° C. and an interfacial tension against mineral oil of 5.0 dynes/cm. at 24° C.

*Example 5*

Into a stirred mixture of 111 g. of n-butanol, 49.5 g. of paraformaldehyde, and 183 g. of anhydrous calcium chloride maintained at 25 to 30° C. in the usual apparatus, dry hydrogen chloride was introduced until the mixture was saturated. The reaction mixture was filtered, and the filtrate was distilled at atmospheric pressure. A fraction boiling at 129 to 134° C. was collected. This consisted mainly of the α-chloroether, n-butyl chloromethyl ether.

24.5 g. of this α-chloroether fraction, dissolved in 25 ml. of N,N-dimethylformamide, was added with stirring in the course of 7 hours to a mixture of 17.1 g. of sucrose, 21.2 g. of anhydrous sodium carbonate, and 50 ml. of N,N-dimethylformamide maintained at 45 to 50° C., in the usual type of apparatus protected from the access of moisture, and the resulting mixture was stirred for another hour at 45 to 50° C. The mixture was filtered and the filtrate was extracted with two successive portions of 40 ml. each of petroleum ether. From the raffinate obtained from the petroleum ether extraction, the solvent was distilled off below 85° C. under reduced pressure. The residue was opaque, white resin, weighing 27 g. A 0.1% dispersion of this residue in distilled water had a surface tension of 40.5 dynes/cm. at 25° C. and an interfacial tension against mineral oil of 11.7 dynes/cm. at 25° C.

*Example 6*

Into a stirred mixture of 33 g. of paraformaldehyde and 100 g. of cyclohexanol maintained at 10 to 15° C. in the usual apparatus protected from the access of moisture, dry hydrogen chloride gas was introduced until the mixture was saturated. 120 g. of anhydrous calcium chloride was added, the mixture was stirred gently for one hour, allowed to stand in the refrigerator overnight, and then filtered to remove the calcium chloride. The filtrate was distilled under reduced pressure and a fraction boiling at 85 to 90° C. at 27 mm. Hg was collected. This consisted mainly of chloromethyl cyclohexyl ether; its chlorine content was 100.1% of the theoretically required amount.

17.1 g. of sucrose was dissolved in 60 ml. of N,N-dimethylformamide by stirring and heating to 90° C. in the usual apparatus protected from the access of mosture.

The solution was cooled to 50° C. and 10.6 g. of anhydrous sodium carbonate was added. The mixture was stirred and maintained at 48 to 52° C. while 14.9 g. of the aforesaid chloromethyl cyclohexyl ether dissolved in 15 ml. of N,N-dimethylformamide was added in the course of 5 hours. The resulting mixture was then stirred at the same temperature for another hour, filtered, and the filtrate worked up as in Example 2. The residue consisted of 30 g. of an amber resin. A 0.1% dispersion thereof in distilled water had a surface tension of 42.0 dynes/cm. at 25° C. and an interfacial tension against mineral oil at 11.5 dynes/cm. at 25° C.

*Example 7*

Into a stirred mixture of 106 g. of benzaldehyde, 130 g. of 2-ethylhexanol, and 122 g. of anhydrous calcium chloride in the usual apparatus, dry gaseous hydrogen chloride was introduced at 0 to 5° C., until the mixture was saturated. The mixture was then filtered; the filtrate was the crude α-chloroether. It contained 86% of the theoretically required amount of chlorine.

A mixture of 17.1 g. of sucrose, 5.3 g. of sodium carbonate and 75 ml. of N,N-dimethylformamide in the usual apparatus, was heated with stirring to 90° C., cooled to 40° C., and then admixed in the course of 2 hours with stirring at 35 to 45° C., with 14.8 g. of the aforesaid α-chloroether. The resulting mixture was then stirred for another 30 minutes at the same temperature and filtered. The filtrate was extracted with two successive portions of 40 ml. each of petroleum ether. From the raffinate, the solvent was distilled off below 85° C. under reduced pressure, and the residue was dissolved in 100 ml. of hot acetone. The solution was filtered from undissolved matter, and from the filtrate the solvents were distilled off under reduced pressure. The residue consisted of 2 g. of a red-brown liquid. A 0.01% solution thereof in distilled water had a surface tension of 41.2 dynes/cm. at 26° C., and an interfacial tension against mineral oil of 12.2 dynes/cm. at 26° C.

*Example 8*

Into a mixture of 114 g. of heptaldehyde and 102 g. of 1-hexanol, dry hydrogen chloride gas was introduced at −8 to −12° C., until the mixture was saturated. The mixture settled in two layers and the upper layer, containing the α-chloroether, was separated and dried over anhydrous calcium chloride.

11.7 g. of this crude α-chloroether dissolved in 25 ml. of N,N-dimethylformamide was added to a mixture of 17.1 g. of sucrose, 5.3 g. of anhydrous sodium carbonate and 50 ml. of N,N-dimethylformamide in the usual apparatus and the resulting mixture was worked up in the manner described in Example 2. 25 g. of a light-amber coloured resin was obtained. A 0.1% dispersion thereof in distilled water had a surface tension of 34.0 dynes/cm. at 25° C., and an interfacial tension against mineral oil of 4.8 dynes/cm. at 25° C.

*Example 9*

Into a stirred mixture of 186 g. of lauryl alcohol, 30 g. of paraformaldehyde and 167 g. of anhydrous calcium chloride in the usual apparatus maintained at 25 to 30° C., dry hydrogen bromide gas was introduced until the mixture was saturated. The mixture was then filtered in order to remove calcium chloride, the filtrate was distilled under reduced pressure. A fraction boiling at 185–202° C./27 mm. Hg was collected. This consisted mainly of the α-bromoether.

17.1 g. of sucrose was dissolved in 75 ml. of N,N-dimethylformamide by stirring and heating to 90° C. in the usual apparatus protected from the access of moisture. The solution was cooled to 50° C., and 5.3 g. of sodium carbonate was added. The mixture was stirred and maintained at 45 to 50° C., while 14.7 g. of the aforesaid α-bromoether fraction was added in the course of 6 hours. The resulting mixture was then stirred at the same temperature for another hour, filtered, and the filtrate extracted with two successive 40 ml. portions of petroleum ether. From the raffinate the solvent was distilled off below 85° C. under reduced pressure. The residue consisted of 38.5 g. of a pale-yellow soft resin. A 0.01% dispersion thereof in distilled water had a surface tension of 37.7 dynes/cm. at 27° C., and an interfacial tension against mineral oil of 13.2 dynes/cm. at 27° C.

*Example 10*

Into a stirred mixture of 33 g. of paraformaldehyde, 122 g. of anhydrous calcium chloride and 194 g. of a commercial lauryl alcohol maintained at 28 to 30° C. in the usual apparatus, dry hydrogen chloride gas was introduced until the mixture was saturated. The reaction mixture was then filtered to remove the calcium chloride. Dry air was bubbled through the filtrate at 20 mm. pressure for 1 hour. The product was the crude chloromethyl lauryl ether and contained 98.5% of the theoretically required amount of chlorine.

17.1 g. of sucrose was dissolved in 60 ml. of N,N-dimethylformamide by stirring and heating to 90° C. in the usual apparatus protected from the access of moisture. The solution was cooled to 50° C. and 6.3 g. of anhydrous sodium bicarbonate was added. The mixture was stirred and maintained at 45 to 50° C. while 12.3 g. of the aforesaid chloromethyl lauryl ether dissolved in 15 ml. of N,N-dimethylformamide was added in the course of 4 hours. The resulting mixture was then stirred at the same temperature for another hour, filtered, and the filtrate worked up as in Example 2. The residue consisted of 29 g. of a light amber, soft resin. It showed good foaming power. A 0.01% dispersion thereof in distilled water had a surface tension of 33.8 dynes/cm. at 25° C. and an interfacial tension against mineral oil of 8.0 dynes/cm. at 25° C.

*Example 11*

17.1 g. of sucrose was dissolved in 75 ml. of dimethyl sulfoxide while the mixture was stirred and heated to 70° C. in the usual apparatus. The solution was then allowed to cool to 50° C., and 5.3 g. of anhydrous sodium carbonate was added. The mixture was well stirred at 50±2° C., and admixed dropwise, in the course of 5 hours, with 12.3 g. of crude chloromethyl lauryl ether (prepared as in Example 10).

The mixture was filtered and the filtrate was extracted twice with 40-ml. portions of petroleum ether. From the petroleum-ether-insoluble matter the solvent was removed below 85° C. by evaporation under reduced pressure. The residue was 28.5 g. of a dark-amber coloured, soft resin. A 0.10% dispersion thereof in distilled water had a surface tension of 36.0 dynes/cm. at 25° C., and an interfacial tension against mineral oil of 11.0 dynes/cm. at 26° C.

*Example 12*

Into a stirred mixture of 96.7 g. of cholesterol, 7.9 g. of paraformaldehyde, 30.5 g. of anhydrous calcium chloride and 500 ml. of benzene maintained at 15 to 19° C. in the usual apparatus protected from the access of moisture, dry hydrogen chloride gas was introduced until the mixture was saturated. The reaction mixture was filtered and the solvent was removed from the filtrate under reduced pressure at a temperature of 25 to 30° C. The residue was dispersed in 200 ml. of refluxing isopropyl ether and the hot solution filtered. The filtrate was concentrated to a volume of about 100 ml., cooled in an ice bath, and filtered. The insoluble material was washed with cold isopropyl ether and dried in a vacuum dessicator. It consisted mainly of chloromethyl cholesteryl ether and had a chlorine content which was 93.3% of the theoretically required amount.

18.6 g. of this crude chloromethyl cholesteryl ether was added in small portions over a period of 2 hours to a stirred mixture of 6.8 g. of sucrose, 5.1 g. of anhydrous sodium carbonate and 115 ml. of N,N-dimethylformamide maintained at 33 to 37° C. in the usual apparatus protected from the access of moisture. The mixture was stirred for an additional 20 hours at 33 to 37° C. and then for 20 hours at 48 to 52° C. The mixture was filtered and the insoluble material was washed with N,N-dimethylformamide. The filtrate and washings were heated to 85° C. under reduced pressure to remove solvent. The residue was a light tan solid weighing 11.0 g. A 0.1% dispersion thereof in a mixture tof 5 parts of ethanol and 95 parts of distilled water had a surface tension of 37.0 dynes/cm. at 25° C. and an interfacial tension against mineral oil of 9.0 dynes/cm. at 25° C.

*Example 13*

Into a stirred mixture of 317 g. of oxo process decyl alcohol, 63.2 g. of paraformaldehyde and 244 g. of anhydrous calcium chloride maintained at 5 to 10° C. in the usual apparatus, dry hydrogen chloride gas was introduced until the mixture was saturated. The reaction mixture was then filtered to remove the calcium chloride. Dry air was bubbled through the filtrate at 19 mm. pressure for ½ hour. The residue consisted of crude chloromethyl decyl ether and contained 97.8% of the theoretically required amount of chlorine.

10.1 g. of this crude chloromethyl decyl ether, dissolved in 15 ml. of N,N-dimethylformamide, was added with stirring in the course of 7 hours to a mixture of 9.0 g. of glucose, 6.5 g. of anhydrous sodium carbonate and 60 ml. of N,N-dimethylformamide maintained at 51 to 53° C. in the usual type of apparatus protected from the access of moisture, and the resulting mixture was stirred for another hour at 51 to 53° C. The reaction mixture was worked up as described in Example 2. The residue consisted of 13 g. of an amber resin. A 0.1% dispersion thereof in distilled water had a surface tension of 38.0 dynes/cm. at 26° C. and an interfacial tension against mineral oil of 8.1 dynes/cm. at 26° C.

*Example 14*

Into a stirred mixture of 186 g. of lauryl alcohol, 33 g. of paraformaldehyde and 122 g. of anhydrous calcium chloride in the usual apparatus, dry hydrogen chloride gas was introduced at 25 to 30° C., until the mixture was saturated. The mixture was then filtered in order to remove calcium chloride and the filtrate was distilled under reduced pressure. A fraction boiling at 160–185° C./15 mm. Hg was collected. This consisted mainly of the α-chloroether.

18.9 g. of d-glucose was dissolved in 75 ml. of N,N-dimethylformamide by stirring and heating to 90° C. The solution was cooled to 50° C., and 10.6 g. of sodium carbonate was added. To this stirred mixture, maintained at 45° to 50° C., 23.4 g. of the aforesaid α-chloroether fraction was added in the course of 5 hours. The resulting mixture was then stirred for another hour at the same temperature. The reaction mixture was worked up as described in Example 2. The residue consisted of 35.5 g. of an amber-coloured resin. A 0.01% dispersion thereof in distilled water had a surface tension of 30.3 dynes/cm. at 28° C., and an interfacial tension against mineral oil of 8.0 dynes/cm. at 28° C.

*Example 15*

Chloromethyl cholesteryl ether was prepared by the method described in Example 12, using methylene dichloride at 2 to 9° C. instead of benzene as a solvent for the reaction. The product had a chlorine content which was 87% of the theoretically required amount.

25.0 g. of this crude cholesteryl ether was added in small portions over a period of 5 hours to a stirred mixture of 9.0 g. of glucose, 6.4 g. of anhydrous sodium carbonate and 150 ml. of N,N-dimethylformamide maintained at 48 to 52° C. in the usual apparatus protected from the access of moisture. The mixture was stirred for an additional 16 hours at 48 to 52° C. The mixture was filtered and the insoluble material was washed with N,N-dimethylformamide. The filtrate and washings were heated to 85° C. under reduced pressure to remove solvent. The residue was a brown resinous solid weighing 21.2 g. A 0.1% dispersion thereof in a mixture of 5 parts of ethanol and 95 parts of distilled water had a surface tension of 30.2 dynes/cm. at 26° C. and an interfacial tension against mineral oil of 6.5 dynes/cm. at 26° C.

*Example 16*

Into a stirred mixture of 33 g. of paraformaldehyde, 122 g. of anhydrous calcium chloride and 189 g. of a commercial lauryl alcohol, maintained at 35° to 40° C. in the usual apparatus protected from the access of moisture, dry hydrogen chloride gas was introduced until the mixture was saturated. The reaction mixture was then filtered in order to remove calcium chloride, the filtrate was distilled under reduced pressure and a fraction boiling at 152–169° C./12 mm. Hg was collected. This consisted mainly of the α-chloroether.

17.2 g. of dextrine was dispersed with stirring in 75 ml. of N,N-dimethylformamide in the usual apparatus protected from the access of moisture and the mixture was heated to 95° C. The mixture was cooled to 50° C., and 5.3 g. of sodium carbonate were added. 11.9 g. of the aforesaid α-chloroether fraction was added in the course of 6 hours to this stirred mixture maintained at 45 to 50° C. The resulting mixture was then stirred at the same temperature for another hour.

The reaction mixture was centrifuged. The centrifugate was extracted with two successive portions of 40 ml. each of petroleum ether. From the raffinate the solvent was distilled off below 85° C. under reduced pressure. The residue consisted of 19.3 g. of a pale-yellow soft resin. A 0.1% dispersion thereof in distilled water had a surface tension of 27.9 dynes/cm. at 27.5 C., and an interfacial tension against mineral oil of 14.7 dynes/cm. at 27° C.

*Example 17*

19.4 g. of dextrine was dispersed in 60 ml. of N,N-dimethylformamide by stirring in the usual apparatus protected from the access of moisture and the mixture heated to 90° C. The mixture was cooled to 55° C. and 5.3 g. of anhydrous sodium carbonate was added. 7.5 g. of the n-hexyl chloromethyl ether prepared in Example 1, dissolved in 15 ml. of N,N-dimethylformamide, was added in the course of 6 hours to this stirred mixture maintained at 48 to 52° C. The resulting mixture was stirred for another hour at the same temperature.

The reaction mixture was worked up as in Example 16. The residue consisted of 18 g. of a pale yellow resin. A 0.1% dispersion thereof in distilled water had a surface tension of 34.5 dynes/cm. at 26° C. and an interfacial tension against mineral oil of 7.9 dynes/cm. at 26° C.

*Example 18*

A mixture of 30.6 g. of commercial vinyl 2-ethylhexyl ether and 1.0 g. of decyl chloromethyl ether, prepared as in Example 13, was added over a period of 4 hours to a stirred solution of 34.2 g. of sucrose in 150 ml. of N,N-dimethylformamide maintained at 48 to 52° C. in the usual apparatus protected from the access of moisture. The mixture was stirred for an additional hour at 48 to 52° C. and then 0.6 g. of anhydrous sodium carbonate was added and the mixture stirred for an additional hour at 48 to 52° C. The mixture was filtered and the filtrate was extracted with two successive portions of 100 ml. each of petroleum ether. From the raffinate obtained by the petroleum ether extraction, the solvent was distilled off below 85° C. under reduced pressure. The residue was a brown resin weighing 43.4 g. A 0.1% dispersion of this residue in distilled water had a surface tension of 39.6 dynes/cm. at 25° C. and an interfacial tension against mineral oil of 16.0 dynes/cm. at 25° C.

We claim:

1. Non-ionic surface active agents containing the molecule of a carbohydrate selected from the group consisting of water-soluble, including colloidally soluble hexose-unit monosaccharides and water-soluble, including colloidally soluble hexose unit polysaccharides in which the hydrogen atom of at least one OH group of the carbohydrate is replaced by a group having the general Formula I

wherein $R^1$ stands for a member selected from the group consisting of aliphatic and cycloaliphatic hydrocarbon radicals, and $R^2$ stands for a member selected from the group consisting of hydrocarbon radicals and hydrogen; the number of said groups of Formula I being at least 1 in the whole molecule, and at most 2 calculated per hexose unit of the molecule, the aggregate number of carbon atoms of $R^1$ and $R^2$, calculated per hexose unit, being from 10 to 19 when said carbohydrate is a monosaccharide, and the aggregate number of carbon atoms of $R^1$ and $R^2$, calculated per hexose unit, being from 4 to 19 when said carbohydrate is a polysaccharide.

2. Non-ionic surface active agents containing a hexose molecule in which the hydrogen atom of at least one and at the most two OH groups of the hexose molecule is replaced by a group having the general Formula I

wherein $R^1$ stands for a member selected from the group consisting of aliphatic and cycloaliphatic hydrocarbon radicals, and $R^2$ stands for a member selected from the group consisting of hydrocarbon radicals and hydrogen; the aggregate number of carbon radicals of the $R^1$ and $R^2$ atoms being from 10 to 19.

3. Non-ionic surface active agents containing the molecule of a carbohydrate selected from the group consisting of water-soluble, including colloidally soluble hexose-unit polysaccharides, in which the hydrogen of at least one OH group of the carbohydrate is replaced by a group having the general Formula I

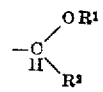

wherein $R^1$ stands for a member selected from the group consisting of aliphatic an dcycloaliphatic hydrocarbon radicals, and $R^2$ stands for a member selected from the group consisting of hydrocarbon radicals and hydrogen; the number of said groups of Formula I being at least 1 in the whole molecule, and at most two per hexose unit, and the aggregate number of carbon atoms of the $R^1$ and $R^2$ radicals being from 4 to 19, calculated per hexose unit.

4. Non-ionic surface active agents according to claim 2, wherein the carbohydrate base is d-glucose.

5. Non-ionic surface active agents according to claim 3, wherein the carbohydrate base is sucrose.

6. Non-ionic surface active agents according to claim 3, wherein the carbohydrate base is dextrin.

7. Non-ionic surface active agents according to claim 2, wherein the $R^2$ radical is hydrogen.

8. Non-ionic surface active agents according to claim 2, wherein the $R^2$ radical is a methyl radical.

9. Non-ionic surface active agents according to claim 3, wherein $R^2$ radical is hydrogen.

10. Non-ionic surface active agents according to claim 3, wherein the $R^2$ radical is methyl.

11. Non-ionic surface active agents according to claim 3, wherein the $R^2$ radical is a phenyl radical.

12. Non-ionic surface active agents according to claim 1, wherein the group $-OR^1$ is the radical of an aliphatic alcohol containing from 4 to 18 carbon atoms.

13. Non-ionic surface active agents according to claim 3, wherein the group $OR^1$ is the radical of cyclohexyl alcohol.

14. Non-ionic surface active agents according to claim 1, wherein the $OR^1$ is the radical of cholesterol.

References Cited in the file of this patent

UNITED STATES PATENTS

| | | |
|---|---|---|
| 2,157,347 | Reppe et al. | May 9, 1939 |
| 2,563,526 | Gaver et al. | Aug. 7, 1951 |
| 2,609,368 | Gaver | Sept. 2, 1952 |
| 2,609,370 | Gaver et al. | Sept. 2, 1952 |
| 2,650,917 | Moe | Sept. 1, 1953 |
| 2,974,134 | Pollitzer | Mar. 7, 1961 |

UNITED STATES PATENT OFFICE
CERTIFICATE OF CORRECTION

Patent No. 3,092,618        June 4, 1963

Milton J. Rosen et al.

It is hereby certified that error appears in the above numbered patent requiring correction and that the said Letters Patent should read as corrected below.

In the heading to the printed specification, title of invention, for "WATER-SOLUBLE NON-IONIC SURFACE-ACTIVE AGENTS OF MONO AND POLYSACCHARIDES" read -- NON-IONIC SURFACE-ACTIVE AGENTS FROM MONO AND POLYSACCHARIDES --.

Signed and sealed this 19th day of May 1964.

(SEAL)
Attest:
ERNEST W. SWIDER

Attesting Officer

EDWARD J. BRENNER
Commissioner of Patents